(12) United States Patent
Seip

(10) Patent No.: US 6,431,592 B2
(45) Date of Patent: Aug. 13, 2002

(54) LINEAR ULTRASOUND TRANSDUCER ARRAY FOR AN AUTOMOTIVE OCCUPANCY SENSOR SYSTEM

(75) Inventor: Ralf Seip, Oxford, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/292,170

(22) Filed: Apr. 15, 1999

(51) Int. Cl.[7] ............................................. B60R 21/32
(52) U.S. Cl. ................................. 280/735; 280/730.2
(58) Field of Search ............................... 280/735, 730.2

(56) References Cited

U.S. PATENT DOCUMENTS

| | | | | |
|---|---|---|---|---|
| 3,791,667 A | * | 2/1974 | Haviland | 280/730.2 |
| 4,963,856 A | * | 10/1990 | Yukitomo | 340/426 |
| 5,118,134 A | * | 6/1992 | Mattes et al. | 280/735 |
| 5,330,226 A | * | 7/1994 | Gentry et al. | 280/735 |
| 5,366,241 A | * | 11/1994 | Kithil | 280/735 |
| 5,602,734 A | * | 2/1997 | Kithil | 701/45 |
| 5,653,462 A | * | 8/1997 | Breed et al. | 280/735 |
| 5,702,123 A | * | 12/1997 | Takahashi et al. | 280/735 |
| 5,845,000 A | * | 12/1998 | Breed et al. | 382/100 |
| 5,954,360 A | * | 9/1999 | Griggs, III et al. | 280/735 |
| 6,007,095 A | * | 12/1999 | Stanley | 280/735 |
| 6,104,972 A | * | 8/2000 | Miyamoto et al. | |
| 6,113,137 A | * | 9/2000 | Mizutani et al. | |
| 6,116,640 A | * | 9/2000 | Tanaka et al. | |
| 6,196,579 B1 | * | 3/2001 | Bowers et al. | |
| 6,199,902 B1 | * | 3/2001 | Cooper et al. | |
| 6,220,627 B1 | * | 4/2001 | Stanley | |

FOREIGN PATENT DOCUMENTS

| | | | | |
|---|---|---|---|---|
| WO | WO 98/33685 | 8/1998 | | B60R/21/32 |
| WO | WO 99/14083 | 3/1999 | | B60R/21/16 |

OTHER PUBLICATIONS

Baumeister, Standard Handbook for Mechanical Engineers, 1967, pp. 5–111.*

* cited by examiner

Primary Examiner—Avraham Lerner
(74) Attorney, Agent, or Firm—Jacques M. Dulin; Innovation Law Group

(57) ABSTRACT

An improved automotive occupancy sensor (AOS) system comprising a linear or spaced array of ultrasound (US) transducers mounted adjacent the headliner of a vehicle to direct an array of US beams to define a preselected occupancy zone adjacent a seat of the vehicle. The AOS electronics may be integrally packaged with the transducer array and flush mounted within the headliner. The array permits occupancy state to be determined by a AOS classification algorithm and method using only or US echo range data, thereby reducing the cost and complexity of the system, improving speed and simplifying calibration.

23 Claims, 4 Drawing Sheets

LINEAR ULTRASOUND TRANSDUCER ARRAY FOR AN AUTOMOTIVE OCCUPANCY SENSOR SYSTEM

DESCRIPTION

1. Technical Field

The invention relates to automotive occupancy sensor (AOS) systems for sensing the occupancy state of a vehicle including the location and/or nature of the occupant with respect to the vehicle interior, and more particularly to a linear or spaced array of ultrasound (US) transducers, used alone or with other sensors, mounted adjacent or in the headliner of a vehicle as part of an AOS system. In the preferred embodiment array permits the occupancy state of one or more seats in the vehicle to be determined by a AOS classification algorithm using only US echo range data, thereby reducing the cost and complexity of the system, improving speed and simplifying calibration.

2. Background Art

Studies have revealed that there is a class of automotive accidents causing injuries associated with airbag deployment and with the nature and position of the vehicle occupant, particularly with respect to airbags deployed toward seats occupied by children or infants in car seats. Automotive occupancy sensor (AOS) systems used in conjunction with cooperating airbag deployment systems (ADS) have been developed to regulate the deployment of the airbag. AOS occupancy determination is used by the ADS to cause airbag deployment to be aborted, deferred, modified as to rate, timing or amount of inflation, selecting which of several airbags to deploy, or otherwise to regulate airbag deployment in response to the occupancy state of the adjacent vehicle interior as classified or determined by the AOS. These are also known as "Smart Airbag Systems". Originally proposed for front airbag systems, smart airbag systems may likewise include AOS for deployment regulation of side airbag systems. For background on AOS systems see Corrado, et al., U.S. Pat. No. 5,482,314 issued Jan. 9, 1996, and also Corrado, et al., U.S. Pat. No. 5,890,085, issued Mar. 30, 1999, and references cited therein, which patents are hereby incorporated by reference.

AOS systems may utilize various types of sensors which produce signals which provide information relating to occupancy state. These include pressure sensors, contact sensors, infra-red sensors, capacitance sensors, visible light sensors and the like. Ultrasound (US) transducers also may be included in AOS systems as active sensors; echoes of US signals transmitted by the transducer are detected by the transducer when reflected back from the vehicle interior and occupants.

AOS systems typically employ sensor systems and relatively complex classification and probability-based decision algorithms which require analysis of a number of different shape, timing and amplitude related aspects of the reflected US signals, in addition to the range of the principal US echo source. In some systems such analysis requires relatively expensive, high-sensitivity US transducers and relatively complex algorithms which process data gathered over relatively large time intervals to classify the occupancy state of the vehicle interior, increasing the amount of time required to arrive at a reliable classification determination. Environmental factors can induce distortions and noise in the US signal, complicating the task of reliable occupancy classification and/or state determination. In addition, the task of constructing a comparative database and designing the microprocessors and associated circuitry to handle the complex algorithm logic is reflected in the overall system development cost and per unit price.

There is a need for an inexpensive, reliable AOS system which can be widely and promptly implemented in production automobiles, especially in light of currently proposed advanced airbag control requirements, such as NHTSA 98–4405, Notice 1 RIN 2127-AG70. There is a need for an AOS sensor system which is inexpensive, reliable, robust (including against environmental disturbances) and which permits simplified, rapid classification based on quantitative US echo range data.

DISCLOSURE OF THE INVENTION

Summary Objects and Advantages of the Invention

It is a principal object and advantage of the invention to provide an array of ultrasound (US) transducers mounted adjacent or in the headliner of the passenger compartment of a vehicle which can provide signals for AOS occupancy classification and/or state determination based principally on simple echo range data. It is another object and advantage of the invention to provide an inexpensive durable sensor system which is easy to install, calibrate and maintain, and which is robust to environmental disturbances. It is another object and advantage of the invention to provide a sensor system which permits simplified and accelerated signal and classification, and/or state determination processing. Other objects and advantages will be evident from the descriptions, drawings and claims of this invention.

The linear AOS transducer array consists of a plurality of transducers, typically 2 to 8, preferably from about 4 to 6 per seat, in a spaced array, preferably mounted within the headliner adjacent the vehicle roof. In principal embodiments the array is an ordered array, generally spanning front to back in the passenger compartment. One preferred embodiment of the array comprises a linear strip of transducers generally parallel to the vehicle centerline mounted recessed into the headliner either generally above or to one side of the aft centerline normal seat position. The array is preferably located slightly to the outboard side of the normal head position, i.e. the fore/aft centerline of the seat. For a front seat occupant, such as the front seat passenger, the array preferably extends from near the rear edge of the sunvisor in front of the seat to about the longitudinal position of the seat headrest when the seat is adjusted to its most rearward position.

Unless the context implies a more restricted meaning, the term "occupant" and the term "object" are used herein to refer to a person(s) or object(s) occupying the seat and/or the volume above a seat (e.g., a driver, passenger, child or infant seat, passenger sitting on another passenger's lap, as parcels, animals or objects resting on a seat, and the like) the presence, motion and/or position of which are relevant to the safety criteria used to determine whether a particular airbag system in a vehicle should be deployed, enabled, disabled, aborted or deployed in a modified manner.

There may be a second AOS array symmetrically mounted on the opposite side of the vehicle centerline to provide occupancy determination for the driver and/or other front seat occupants. Arrays may be provided for occupant seats behind the driver/front passengers, i.e. in the middle or rear seating areas as desired. While the arrays are described herein in the present best mode as linear and generally parallel to the centerline, they also may be transverse or diagonal, as in a patterned array, e.g. at the vertices of a triangle, diamond or other polygon.

The transducers of the array are directed generally downward to transmit a generally parallel spaced set of US pulses. The downwardly directed set of pulses cover ("bathe" or "paint") a volume of the vehicle interior denoted as the head zone (generally referred to herein as "H-zone"), which is a pre-selected occupancy zone. The H-zone is preferably defined by the volume in which the head and/or shoulders of an occupant will be present under circumstances under which the AOS classification algorithm determines that the airbag is to be enabled for deployment, or conversely, is to be aborted or disabled. The specific bounds of the H-zone are ordinarily preselected, based, e.g., on airbag characteristics for deployment safety and injury criteria. Likewise, if there is no occupant, or the occupant is out-of-position with respect to the H-zone so that the head and/or shoulders of the occupant do not intrude into the H-zone, the AOS classification algorithm determines that the airbag is to be disabled or not enabled, as the case may be, enabled with modified inflation rate, level or timing; or otherwise modified for deployment or nondeployment. An example of an out-of-position state (OOPS) is a seated child whose head is below the H-zone boundary, or an adult passenger leaning forward towards the dashboard or reclining backward, with head below and/or forward or back of the H-zone boundary.

The AOS electronic circuitry maybe conventional. The US pulse is reflected from the surfaces lying below the transducer and the reflected echo is received by each respective transducer to produce an input signal to the AOS electronics. Range data is determined from the input signal by the AOS electronics to determine the distance of the object or surface producing the primary echo, such as an occupant's head or body, an infant seat, a seat cushion, parcels resting on the seat, etc. Collectively, the range data for the transducer array permits the AOS classification algorithm to determine if an object, such as the head, is within the H-zone, and to determine the object's fore-to-aft position within the H-zone.

Optionally the time history of the range data for each transducer can be used to determine whether an occupant (i.e., occupant's head and/or shoulders) is moving with respect to the vehicle and seat, such as when a passenger is moving or leaning forward, and this may used as an input in determining whether the airbag deployment is to be enabled, disabled or modified.

Because the AOS transducer array of the invention permits occupancy classification based on US range information, transducers of lower sensitivity may be used, as compared to systems which require more complex qualitative and amplitude sensitive information to be extracted from the input signal. Thus, inexpensive, lower sensitivity lead zirconate/titanate (PZT) type transducers may be employed, offering a number of important advantages over the higher sensitivity transducers conventionally required for AOS systems. PZT sensors are robust, inexpensive, do not require protective grills, may be produced as very thin disks, and can be flush-mounted in the headliner with no projections. Because the PZT sensors are generally directed perpendicularly downward in the arrays of the invention, they may be, if desired, be comparatively larger without projecting from the headliner surface, the larger size compensating for and permitting reduced sensitivity.

All the sensors, electronics, and detection logic are preferably housed inside a single, self-contained unit. The transducers are typically mounted on a thin, elongated mounting board, which optionally also integrally mounts the AOS electronic circuitry, processors, interconnecting leads and an exterior trim surface or cover. Due to the thin profile of the PZT transducers (about 2 to 5 mm thick), an integral transducer array/AOS unit may be mounted entirely between the roof and the headliner, an area typically with a depth on the order of 20± mm, and generally unused for other functions. For the preferred PZT sensors, no grill is needed, and the sensor surface, as well as the surface of the array unit, can be painted in any desired color that matches the interior so as to "blend in" with the headliner. Optionally a decoratively textured coating may be applied to the trim or/and the transducers.

The length of the H-zone and the transducer array may be selected to take into account the range of occupant head position based on the range of seat fore/aft adjustment. The H-zone extent may be defined differently for a driver seat and a passenger seat, taking into account, among other things, the typically different positions of the airbag installation. The spacing and number of the transducers of the array may be selected to provide adequate discrimination between the occupant's head and other fixed objects, such as a seat headrest. Preferably, the spacing and number of transducers is selected so that the headrest, if present, will give a US echo range return on at least one transducer. Also the transducers spacing and number is preferably selected so that the occupant's head will give a range return on more than one transducer, more preferably at least three.

The position of the occupant within H-zone is determined by an AOS algorithm based on the H-zone definition (configuration and location in the compartment) and the pattern of range returns from the transducers of the array. Typically, the algorithm is implemented by code written in conventional computer or device languages, or is implemented by logic circuitry comprising conventional devices. The method and algorithm of determining occupant position of the present invention as described herein can be executed by the AOS electronics which includes suitable hardware and/or software and/or firmware running on a suitable processor. Typically, the firmware or software is accessed by a processor using any suitable reading device which can read the medium on which the software or firmware is stored, such as any suitable processor-readable storage medium. The storage medium includes, for example, magnetic storage media, or solid state electronic storage devices such as random access memory (RAM) or read only memory (ROM); or any other physical device or medium employed to store a computer program. The software or firmware carries program code which, when read by the processor, causes the computer to execute any or all of the steps of the methods disclosed in this application.

The linear AOS array of this invention has the following advantages in comparison to existing console type AOS systems:

1. The preferred PZT transducers are inexpensive and robust.

2. The preferred PZT transducers have a exterior surface that can be cleaned, is tough, and is unaffected by condensation and mass-loading (i.e., may be cleaned like the rest of the interior).

3. Calibration is simplified since only range is used for classification.

4. System testing is simple, since there is no need to test many occupant scenarios, the classification being based on simple H-zone presence/absence criteria and the location of the seatback with respect to the person's head.

5. A simpler processor with less memory can be used to evaluate the signals.

6. Sensor self-test (which optionally may be included) is more robust, since all sensors are pointed down and will by default hit a flat surface (vehicle seat or floor) in the absence of an occupant, which will return an echo, as compared to angled sensors that might not receive an echo during self-test routines due to non-perpendicular surfaces, such as a seat surface at an angle with respect to the sensor direction.

7. The AOS installation is simplified, as no center console modifications are needed. In a retrofit case, for example, the installation comprises simply cutting out a slot in the headliner, flush mounting the integral AOS/transducer array unit by fasteners, adhesives, or other fastening means, and connecting wiring to power source and airbag deployment system.

8. Installation is further simplified since tolerances on angles and displacements can be relaxed (again, only range is computed, which is amplitude independent, and robust to alignment variation). The preferred use of two mirror-image AOS arrays units, one for passenger seat coverage and one for driver seat coverage, would maintain a symmetrical appearance of the vehicle interior.

9. Faster AOS occupancy classification update rate is possible due to simplified processing. The following example case shows typical AOS update rate time ranges with the AOS transducer array of the invention: Given about a 1 meter distance between the sensor and the seat surface, the US echo signal is acquired in approximately 6 ms. The signal is processed within about 4 ms., and the update rate, per sensor, is approximately 10 ms. In a system with 6 sensors, for example, a update rate of 60 ms or less is achievable over the whole zone, without complex processing circuitry or algorithms.

Still faster speeds are possible with the addition of a dynamic-mode switchover in which the AOS system includes sensors (such as a low-G sensor, pre-crash braking sensor, etc.) to determine the existence of a crash-imminent state (i.e., a high probability of the imminent occurrence of a collision or other high-deceleration event). During the existence of a crash-imminent state, the AOS electronics only pings a single ultrasound transducer (or sub-set of the such sensors) which define a front keep-out-zone (KOZ), e.g., the forward sensor(s) can be aimed ahead of the defined H-zone, and be used to define a KOZ. The use of a single sensor or transducer (or a subset) permits a faster AOS update rate during a crash imminent state.

In addition, forward occupant movement motion tracking (e.g., for example into the KOZ) is simple due to the linear arrangement and centerline parallel location of the sensors. The time history of range data can be used by the AOS to determine occupant motion (both motion history and instantaneous velocity), and predict occupant position over future time-increments, which predictions optionally may then be used for ADS control.

10. Ultrasonic interference from entertainment system speakers is minimal, since all sensors point vertically down into the cabin, and speakers are typically positioned on the doors and walls, pointing into the cabin horizontally. There are no rear-view mirror interference issues, as well as no sunvisor interference issues, since the typical H-zone boundary starts some distance rearward of the sunvisor and rear-view mirror.

11. The overhead linear AOS design concept of the invention is applicable to vehicles with a sunroof, as the sunroof can be fit between both driver and passenger units.

12. The unit would be cheaper than current designs, mainly because a less powerful processor is needed, less memory is needed, no grill is needed, no bezel is needed, but only a single-piece sensor mounting piece that holds the sensors and a single circuit board. Cost savings can also be realized due to the elimination of a Faraday cage for the sensors. The range feature is amplitude independent, and works well under low SNR (Signal-to-Noise Ratio) conditions; sensor deterioration over time would not affect performance.

13. The linear array AOS system optionally functions as an intrusion/anti-theft system, on both driver and passenger sides, the AOS system including an algorithm to use the US range data to determine an intrusion (presence of an occupant when system is armed in an anti-theft mode) into the vehicle. In response the array of the present invention outputs a signal to an anti-theft device, such as an audible alarm. The linear AOS array can be extended to cover the back seats with conventional modifications. Additional sensors (such as IR, mass sensor, etc.), even where not needed for classification, may optionally be included in the AOS for temperature control, for example.

BRIEF DESCRIPTION OF DRAWINGS

The invention is described in more detail in the accompanying drawings, in which:

FIGS. 1A, B, C and D show schematic views of the front seat occupant area of a vehicle interior including the linear AOS transducer array of the invention, in which FIG. 1A is a rear view and FIG. 1B is a side view of the passenger side.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications and patent applications cited in this specification are herein incorporated by reference as if each individual publication or patent application were specifically and individually indicated to be incorporated by reference.

Figure 1A:
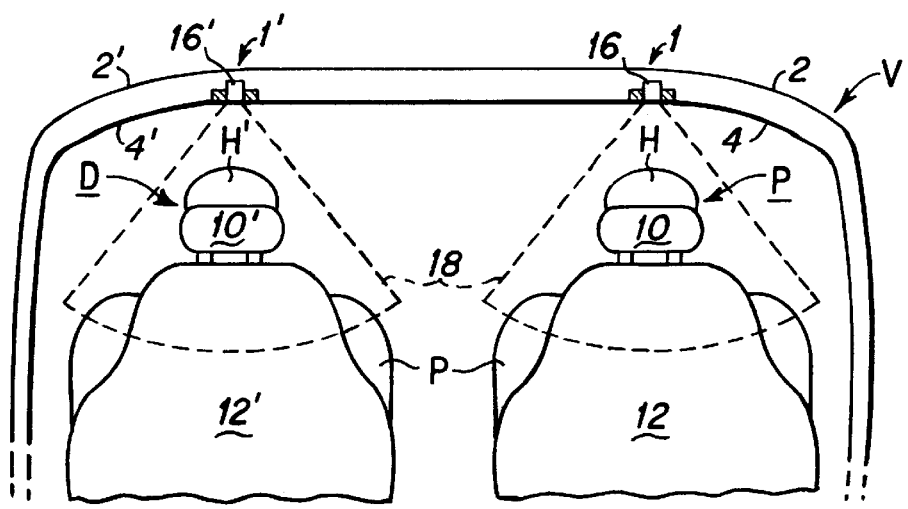
Figure 1B:
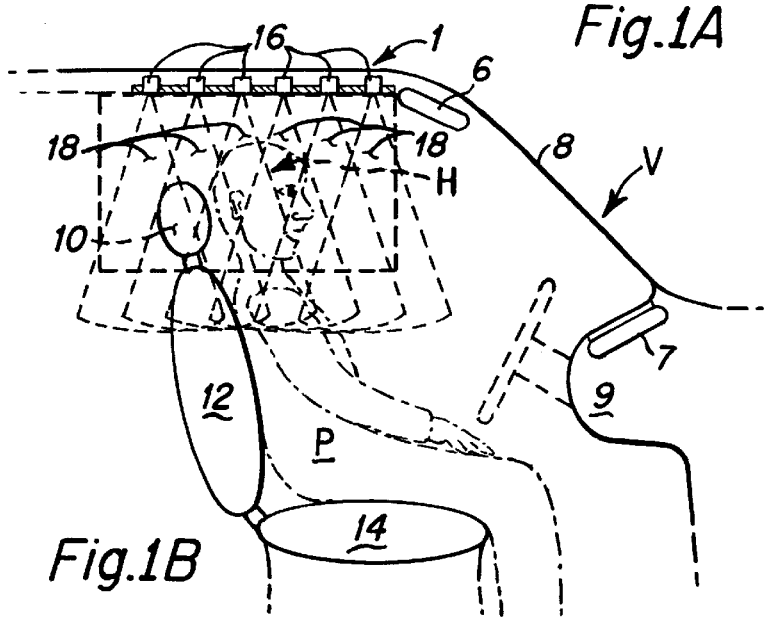
Figure 1C:
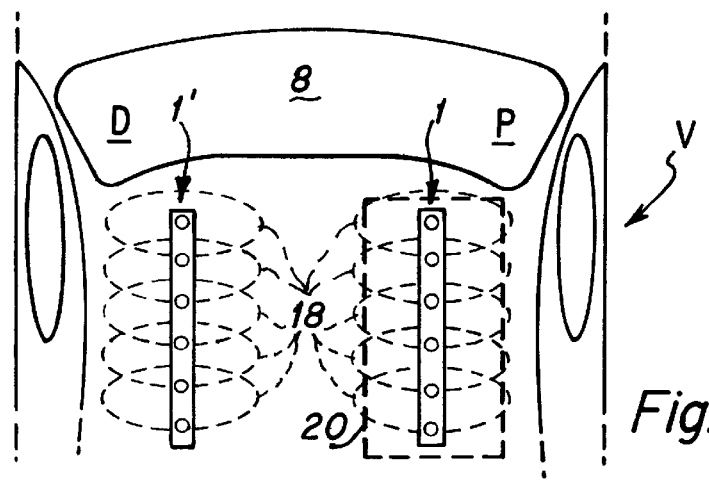
FIG. 1C is a top view.
Figure 1D:
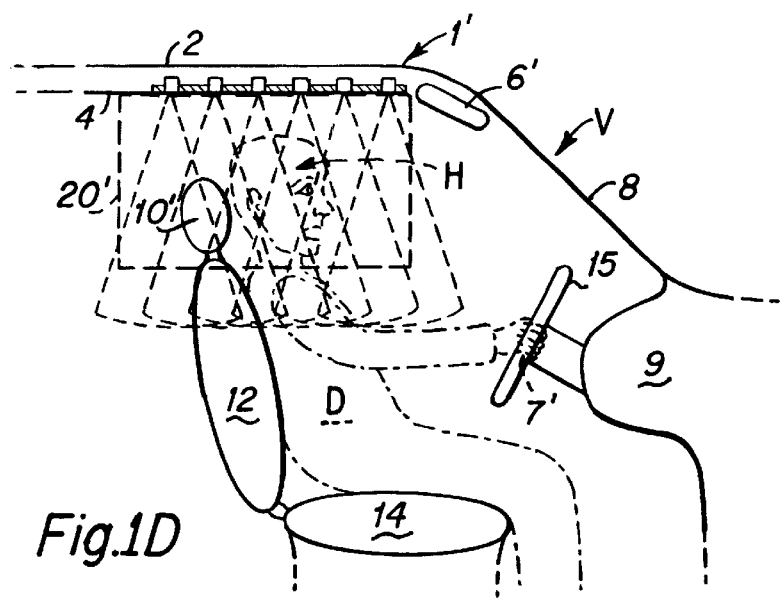
FIG. 1D is a side view of the drivers side.

FIGS. 1A to D show a schematic rear view, passenger's side view, top view, and driver's side view respectively of the front seat occupant area of a passenger P in vehicle V seated in seat 12, 14 with the head H projecting in the H-zone 20. The linear AOS transducer array of the invention 1 is mounted between the roof 2 and the headliner 4. The AOS array 1 extends longitudinally generally parallel to the vehicle centerline from about the rear margin of the sunvisor 6 adjacent windshield 8, rearwardly to about the position of the headrest 10 of seatback 12 of seat 14 and is located laterally about over the seat centerline or axis. As shown in FIG. 1B, the passenger airbag assembly 7 is mounted in dashboard 9 and may reflect off windshield 8. The exemplary AOS embodiment shown includes 6 PZT transducers 16 spaced longitudinally, preferably in a substantially straight line along the AOS unit 1. A second, mirror-image AOS installation 1' is shown in FIGS. 1A and 1D mounted over the left-hand driver seat 14' in the same manner and orientation as the passenger side AOS 1. The driver's airbag assembly 7' is typically mounted in steering wheel 15.

The transducers 16 are flush mounted at the level of the headliner 4 and are directed generally vertically downward to produce an array of ultrasound (US) beams 18 (dashed lines) directed towards the seat area. The beams 18 (i.e. path of main US pulse strength) spread laterally as they propagate downward, and are preferably shaped in cross-section to be generally elliptical with the major axis aligned laterally (transversely) with respect to the vehicle fore/aft axis, in order to spread to cover the seat area side-to-side. Collectively, the beams 18 spread to cover the longitudinal and lateral extent of the H-zone 20 (thick dashed line) in which the head H of the passenger P is shown as projecting. The lower extent of the H-zone is determined by airbag deployment safety criteria and may range from about the vertical level of the middle of the seatback 12 to the top of the seat back. Alternatively, transducers emitting generally circular cross-section beams may be used, with additional transducers being included where necessary in an appropriately spaced configuration to produce beams to cover the extent of the H-zone 20.

Figure 7:
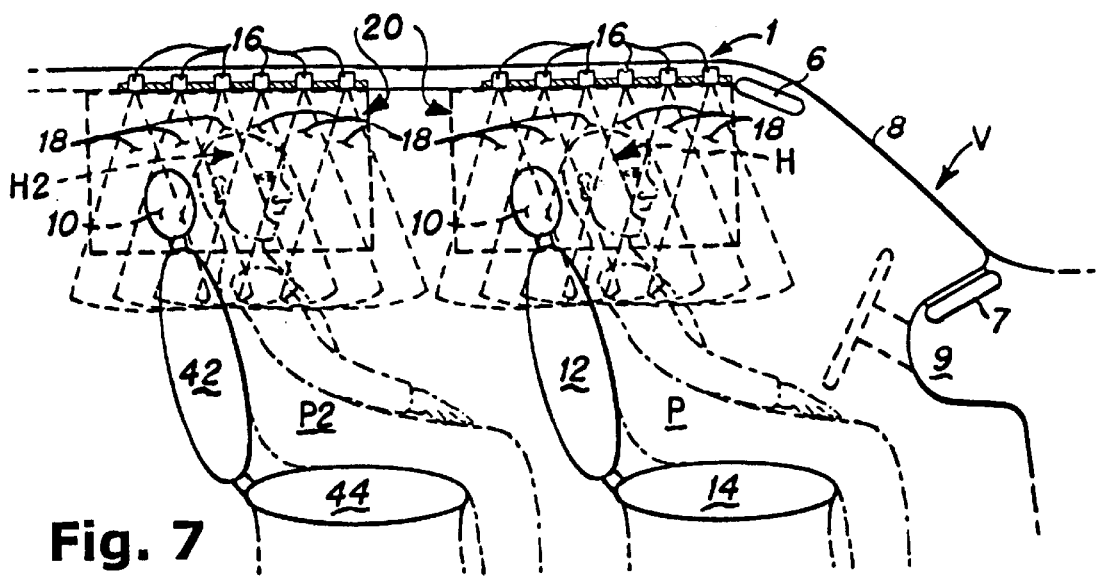
FIG. 7 is a schematic side view, an alternate embodiment of the invention of FIG. 1B, which includes an AOS transducer array above the rear seat as well as the front seat.

FIG. 7 shows a schematic side view of both the front and rear seat occupant areas, including passengers P and P2 in vehicle V seated in seats 12, 14 and 42, 44 with their heads, H and H2 in the respective H-zones, 20. This Figure is otherwise identical to FIG. 1B, in its description.

Figure 2:
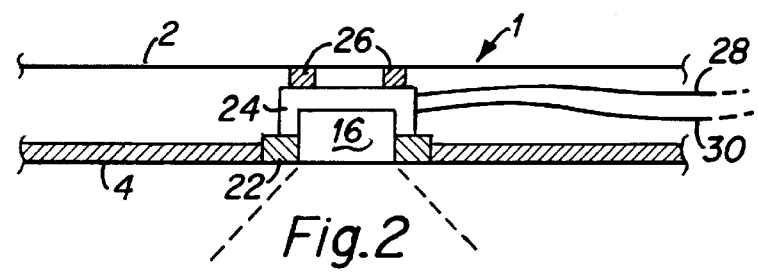
FIG. 2 shows a schematic cross section of the linear AOS transducer array mounted in the space between the headliner and roof of a vehicle.

FIG. 2 is a schematic detailed cross-section of the installation of AOS unit 1 showing one of the transducers 16 and integral AOS cover or edge bezel 22 flush mounted at the level of headliner 4. The transducers are mounted to a mounting board 24, which optionally includes electronics/circuitry, which board is in turn mounted to the roof 2 by a plurality of fasteners or adhesive pads 26. Power supply wiring 28 and AOS output signal wiring 30 are shown extending from the AOS unit 1 to the vehicle electrical system and airbag deployment system (not shown), respectively.

Figures 3, 4:
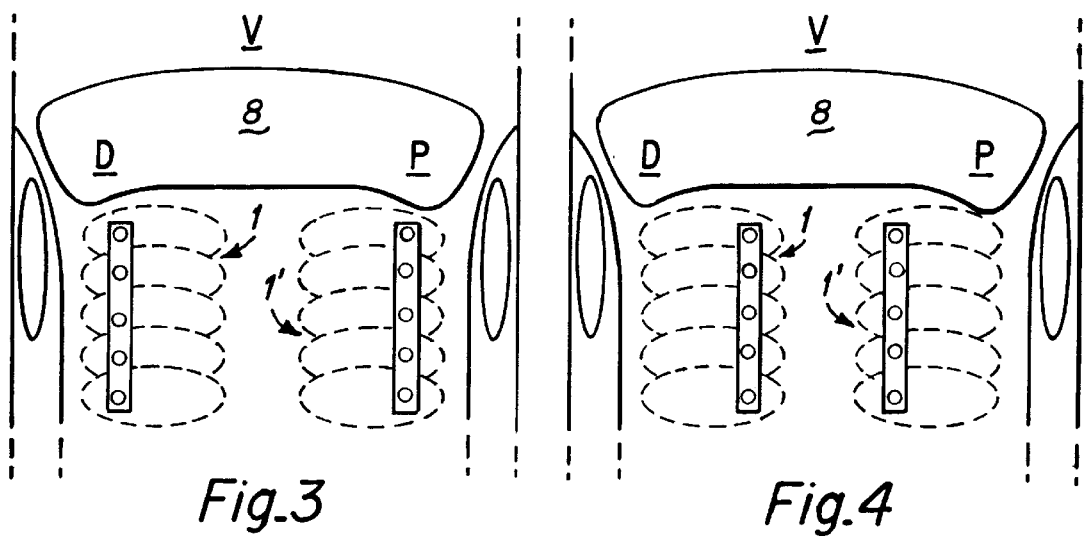
FIG. 3 shows a top view of a first alternative mounting of the AOS array shown in FIG. 1C.
FIG. 4 shows a top view of a second alternative mounting of the AOS array shown in FIG. 1C.

FIGS. 3 and 4 show a first and a second alternative mounting of the AOS unit 1. In FIG. 3 the AOS unit 1 is mounted in a lateral position offset somewhat outboard of the driver's seat centerline or fore/aft central axis, and the opposite side AOS unit 1' is similarly mounted somewhat outboard of the passenger's side seat central axis (for a typical automobile, the seat axis is generally parallel to the vehicle centerline). The US beams 18 are angled slightly inward to compensate for the outboard mounting of the AOS 1. The array offset permits the headliner directly above the seat center to be padded and free of hard AOS elements. The spacing between the two units is enough to permit installation of a sun/moon roof unit between them. Alternatively, the transducers of the invention may be integrated into one or more marginal edge trim strips of the sun/moon roof unit.

In FIG. 4 the AOS unit 1 is mounted in a lateral position offset somewhat inboard of the driver's side seat centerline, and there is a similar inboard offset on the passenger side AOS 1'. The inboard/outboard offset mounting shown in FIGS. 3 and 4 permits the headliner area above the occupant's head to comprise padded material to comply with possible head injury regulatory requirements.

Figure 5:
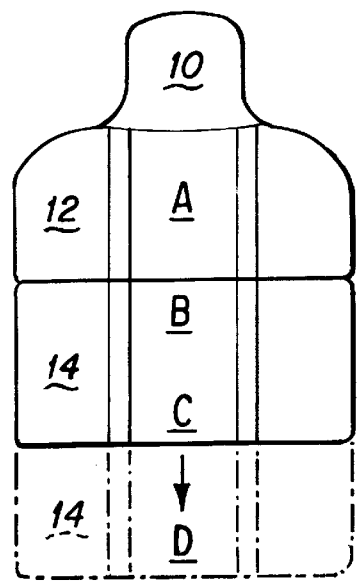
FIG. 5 shows a schematic top view of an occupant seat showing examples of target points for transducers of the AOS array.

FIG. 5 shows schematically a top view of a front seat with examples of center points at which the transducer beams are aimed. Four points (a)–(d) are shown, although the AOS array may have more or fewer transducers: (a) the seatback 12 with the seat 14 adjusted fully to its rearward (back) position; (b) the rear portion of the seat cushion 14 with the seat fully back; (c) the front portion of the seat cushion 14 with the seat fully back; and (d) the front portion of the seat cushion 14 with the seat adjusted fully forward. Additional transducers and aiming points may be included if desired to further subdivide the H-zone, such as multiple transducers aimed at sections of the seat back when it is in a reclined configuration.

Figure 6A:
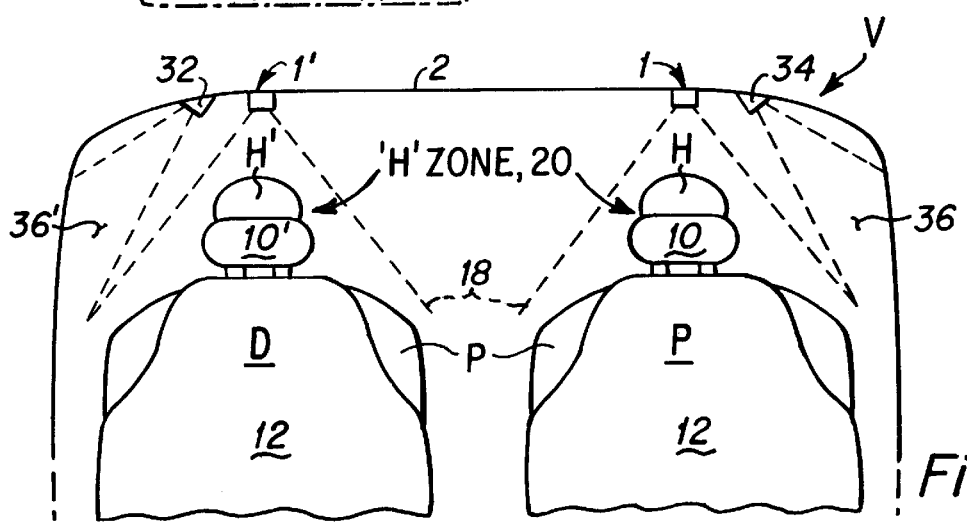
FIGS. 6A and 6B show schematic views of the front seat occupant area of a vehicle interior in the same configuration as in FIGS. 1A and 1C, and show an additional embodiment of the transducer array of the invention for a side airbag AOS which defines a side keep-out zone.
Figure 6B:
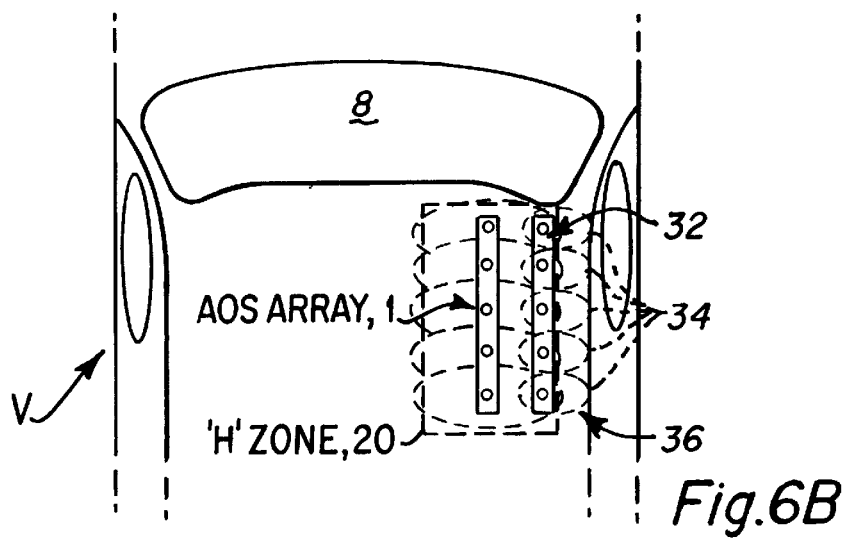

The linear AOS transducer array may optionally also be employed in AOS systems which regulate side-deploying airbags to protect occupants in accidents involving high sideward accelerations, such as in side-impact collisions. The range data from the H-zone transducers may be used for this purpose, or a separate array defining a side "keep-out zone" (KOZ) may be used. FIGS. 6A and 6B show the front seats and occupants of a vehicle in the same configuration as in FIGS. 1A and 1C, and show a side airbag AOS array 32 in addition to the front airbag AOS array 1. The side array 32 is preferably located outboard of the front airbag array in the headliner adjacent the side window area, and emits US beams 34 aimed at a volume adjacent the side window area. Optionally, the side array 32 can be integrated into the same circuit board package as front array 1, with the respective individual transducers of each array aligned or aimed to define a corresponding US beam of the H-zone 20 and side keep-out zone 36 respectively. A Side Keep-Out-Zone (SKOZ) 36 is pre-defined by the US beams, the extent of the SKOZ depending on the specific deployment characteristics and associated injury criteria of the particular type of side airbag system or other side protection system employed (such as a downward, forward, rearward, upward or diagonal deploying side airbag system or an extensible inflating/padded webbing system). Upon receipt of an AOS state or classification output indicating occupant head and/or shoulder intrusion into the SKOZ 36, the side airbag deployment system disables or modifies the enablement of the side airbag.

INDUSTRIAL APPLICABILITY

It is clear that the linear AOS transducer array of the invention has wide industrial applicability to AOS systems for automotive airbag systems. The AOS transducer array and its associated classification and calibration algorithms can readily be adapted to alternative transducer arrays which are not linearly spaced, but which are geometrically spaced adjacent the headliner to provide a comparable array of US beams to define the H-zone.

In addition to use in front airbag systems (airbags deploying generally forward of an occupant, particularly to protect the occupant in a front-impact collision), the AOS transducer array of the invention is also useful for regulation of the deployment of side airbag systems (airbags and/or other protective elements deploying generally to the side of an occupant, particularly to protect the occupant in a side-impact collision).

It should be understood that various modifications within the scope of this invention can be made by one of ordinary skill in the art without departing from the spirit thereof. It is therefore wished that the invention is to be defined by the scope of the appended claims as broadly as the prior art will permit, and in view of the specification and equivalents, if need be.

What is claimed is:

1. An improved Automotive Occupancy Sensor system unit mountable within the headliner of a vehicle passenger compartment for determination of the presence of an occupant in a zone above at least one seat within said vehicle, said headliner defining the top of the interior space of said vehicle passenger compartment, said unit outputting a signal indicative of presence of an object in a Head-zone defined between said headliner down to about the seat back vertical mid-point to determine occupancy state of said seat for use in cooperation with an airbag deployment system, said unit comprising in operative combination:

a) at least one housing in which is mounted a spaced array of selectively directed sensors, said array including a plurality of ultrasound transducers, said housing providing for mounting in the headliner of the vehicle generally above said seat so that said ultrasound transducers are directed generally downward into said Head-zone adjacent and above said seat, and said ultrasound transducers do not substantially project into said vehicle interior space below said headliner, and wherein each individual transducer is both the emitter of pulses and receiver of the echoes of the respective pulses emitted by said individual transducer, said array excludes a separate receiver-only device, and an array in which transducers are paired and the transducers of each pair are aimed to have intersecting center axes is disclaimed;

b) Automotive Occupancy Sensor electronics mounted in said housing connected to said array for selective emission by individual ones of said ultrasound transducers of ultrasound pulses downwardly into a selected portion of said vehicle interior space and for receipt by each respective individual transducer of the return echo of its pulse and analysis of said echoes from said defined Head-zone; and c) said Automotive Occupancy Sensor electronics including a processor and at least one classification algorithm using range data derived from said echoes to produce and to output a unique signal, indicative of the determination of the presence or absence of an object in said defined Head-zone without determination of acceleration of said object relative to deceleration of said vehicle.

2. An improved Automotive Occupancy Sensor system as in claim 1, wherein at least one of said ultrasound transducers is a piezoelectric transducer sensor.

3. An improved Automotive Occupancy Sensor system as in claim 1, wherein:

a) said vehicle has a centerline; and b) said transducer array is disposed in a line generally parallel to said vehicle centerline.

4. An improved Automotive Occupancy Sensor system as in claim 3, wherein a) said seat has a central, fore-aft axis; and b) said transducer array line is offset and generally parallel to said seat axis.

5. An improved Automotive Occupancy Sensor system as in claim 4, wherein said array line is offset outboard of said seat axis.

6. An improved Automotive Occupancy Sensor system as in claim 4, wherein said array line is offset inboard of said seat axis.

7. An improved Automotive Occupancy Sensor system as in claim 3, including at least one of said transducer arrays disposed generally above each of a driver seat and a front passenger seat.

8. An improved Automotive Occupancy Sensor system as in claim 7, further including at least one of said transducer arrays disposed generally above at least one rear passenger seat.

9. An improved Automotive Occupancy Sensor system as in claim 7, further including at least one of said transducer arrays disposed generally above both a rear passenger seat and one of a front passenger seat and a driver seat, said array being directed downwardly into the defined Head-zone with respect to the occupancy of each of said seats.

10. An improved Automotive Occupancy Sensor system as in claim 1, wherein said Automotive Occupancy Sensor system electrically outputs said presence or absence determination signal to an airbag deployment system for use in regulating the deployment of at least one of a front airbag system and a side airbag system.

11. An improved Automotive Occupancy Sensor system as in claim 1, wherein a) a subset of at least one of said ultrasound transducers but less than the full array of said ultrasound transducers is directed to define a Keep-Out zone located forward of said H-zone;

b) said Automotive Occupancy Sensor includes sensors to determine whether a crash-imminent state exists; and c) in response to a determination of the existence of said crash-imminent state, said Automotive Occupancy Sensor processors use range data limited to said Keep-Out zone subset of said transducers of said array to determine motion of an occupant into said Keep-Out zone, to initiate a faster update rate of said output signal during the existence of a crash-imminent state.

12. An improved Automotive Occupancy Sensor system as in claim 1, wherein said array does not include a Faraday cage for at least one of said transducers.

13. An improved Automotive Occupancy Sensor system as in claim 1, wherein a) said Automotive Occupancy Sensor electronics includes a processor and at least one algorithm to determine from said range data an intrusion of a person into a parked vehicle; and b) said Automotive Occupancy Sensor electronics outputs an intrusion signal to at least one anti-theft device.

14. An improved Automotive Occupancy Sensor system unit mountable within the headliner of a vehicle passenger compartment for determination of the intrusion of an occupant into a side Keep-Out zone, said Keep-Out zone being defined above at least one seat within said vehicle and adjacent the vehicle seat side as extending downwardly from the headliner of said vehicle interior to about the vertical mid-point of said seat back and from a vehicle interior side to an adjacent side of a vehicle seat, said unit outputting a signal indicative of presence of a object in said Keep-Out zone for use in cooperation with an airbag deployment system for side-impact protection, said unit comprising in operative combination:

a) at least one housing in which is mounted a spaced array of selectively directed sensors, said array including a plurality of ultrasound transducers, said housing providing for mounting in the headliner of the vehicle generally above said seat so that at least one ultrasound transducer is directed generally downward into said Keep-Out zone above said seat and adjacent the vehicle side, and said ultrasound transducers do not substantially project into said vehicle interior space below said headliner, and wherein each individual transducer is both the emitter of pulses and receiver of the echoes of the respective pulses emitted by said individual transducer, said array excludes a separate receiver-only device, and an array in which transducers are paired and the transducers of each pair are aimed to have intersecting center axes is disclaimed;

b) Automotive Occupancy Sensor electronics mounted in said housing connected to said array for selective emission by individual ones of said ultrasound transducers of ultrasound pulses into a selected portion of said vehicle interior space and receipt by each respective individual transducer of the return echo of its pulse and analysis of said echoes from said Keep-Out zone; and c) said Automotive Occupancy Sensor electronics including a processor and at least one classification algorithm using range data derived from said echoes to produce and to output a unique signal, indicative of the determination of the presence or absence of an object in said defined Keep-Out zone without determination of acceleration of said object relative to deceleration of said vehicle.

15. An improved Automotive Occupancy Sensor system as in claim 14, wherein at least one of said ultrasound transducers is a piezoelectric transducer sensor.

16. A method of determining the presence of an occupant in a zone above at least one seat within a vehicle for an airbag deployment system, comprising the steps of:

a) defining a preselected occupancy Head-zone adjacent and above said seat defined between the headliner of said vehicle interior down to about the seat back vertical mid-point;

b) transmitting a plurality of spaced ultrasound transducer pulses in a spaced array from a plurality of spaced transducers downward from above towards said seat into said occupancy Head-zone, and wherein each individual transducer is both the emitter of pulses and receiver of the echoes of the respective pulses emitted by said individual transducer, said array excludes a separate receiver-only device, and an array in which transducers are paired and the transducers of each pair are aimed to have intersecting center axes is disclaimed;

c) evaluating for at least one transducer the return ultrasound echo signals corresponding to its pulses to derive echo range values from said return echo signals;

d) determining object presence within said defined Head-zone from said echo range values; and e) sending a least one signal to said airbag deployment system indicative of one of the presence and the absence of an object in said Head-zone.

17. A method of determining the intrusion of an object in a Keep-Out zone at least one seat within a vehicle for an airbag deployment system, comprising the steps of:

a) defining a preselected occupancy Keep-Out zone in said vehicle interior space extending downwardly from the headliner of said vehicle interior to about the vertical mid-point of said seat back and from a vehicle interior side to an adjacent side of a vehicle seat;

b) transmitting a plurality of spaced ultrasound transducer pulses in a spaced array from a plurality of spaced transducers downward from above into said occupancy Keep-Out zone above said seat and adjacent the vehicle seat side, and wherein each individual transducer is both the emitter of pulses and receiver of the echoes of the respective pulses emitted by said individual transducer, said array excludes a separate receiver-only device, and an array in which transducers are paired and the transducers of each pair are aimed to have intersecting center axes is disclaimed;

c) evaluating for at least one transducer the return ultrasound echo signals corresponding to its pulses to derive echo range values from said return echo signals;

d) determining object intrusion into said defined Keep-Out zone from said echo range values; and e) sending a least one signal to said airbag deployment system indicative of one of the intrusion and the non-intrusion of an occupant in said Keep-Out zone.

18. An improved sensor system for a vehicle interior Automotive Occupancy Sensor, comprising in operative combination:

a) a mounting board means for mounting sensors in the top headliner of a vehicle to not substantially project into said vehicle interior;

b) a plurality of ultrasound transducers mounted on said mounting board; and c) said transducers are mounted on said board in a spaced array angled to provide coverage in at least one defined zone in said vehicle selected from:
  i) an occupancy Head-zone extending downwardly from said headliner to about the vertical mid-point of the back of a seat in said vehicle;
  ii) a Keep-Out zone forwardly of said Head-zone above a seat in said vehicle and adjacent a front dashboard in said vehicle; and
  iii) a side Keep-Out zone above a seat in said vehicle and extending from a side of said vehicle interior to an adjacent side of a vehicle seat; and
d) wherein each individual transducer is both the emitter of pulses and receiver of the echoes of the respective pulses emitted by said individual transducer, said array excludes a separate receiver-only device, and an array in which transducers are paired and the transducers of each pair are aimed to have intersecting center axes is disclaimed.

19. An improved sensor system as in claim 18, wherein at least one of said ultrasound transducers is a piezoelectric transducer sensor.

20. An improved sensor system as in claim 18, wherein said the transducers of said spaced array are mounted in a generally straight line on said board.

21. An improved sensor system as in claim 18, wherein said defined zone is said occupancy Head-zone.

22. An improved sensor system as in claim 18, wherein said defined zone is one of said Keep-Out zones.

23. An improved sensor system as in claim 18, wherein said transducers are mounted on said board in a spaced array angled to provide coverage in at least two of said defined zones in said vehicle.

* * * * *